(12) United States Patent
Carlson

(10) Patent No.: US 6,948,720 B1
(45) Date of Patent: Sep. 27, 2005

(54) COMPUTER CONTROLLED POSITIONING TABLE

(76) Inventor: James D. Carlson, 5122 E. 84th Pl., Tulsa, OK (US) 74137

( * ) Notice: Subject to any disclaimer, the term of this patent is extended or adjusted under 35 U.S.C. 154(b) by 387 days.

(21) Appl. No.: 10/315,418

(22) Filed: Dec. 10, 2002

(51) Int. Cl.[7] .......................... B23B 31/00; B23Q 3/00; B23Q 16/02
(52) U.S. Cl. ..................... 279/5; 279/133; 279/141; 408/103; 74/813 R; 74/813 L; 269/63
(58) Field of Search .................. 74/813 R, 813 C, 74/813 L; 269/63; 279/5, 133, 141; 408/70, 408/71, 87, 89, 91, 103; 409/221

(56) References Cited

U.S. PATENT DOCUMENTS

| | | | |
|---|---|---|---|
| 2,904,339 A * | 9/1959 | Swanson et al. ............. 279/112 |
| 3,011,245 A * | 12/1961 | Mueller ...................... 29/38 A |
| 3,496,832 A * | 2/1970 | Lang et al. .................. 409/221 |
| 3,663,458 A * | 5/1972 | Ito ......................... 252/519.52 |
| 3,667,305 A * | 6/1972 | Rassoira ....................... 74/818 |
| 3,786,721 A * | 1/1974 | Reda .......................... 409/165 |
| 4,211,512 A * | 7/1980 | Zankl ......................... 409/221 |
| 4,330,110 A | 5/1982 | Creech |
| 4,333,363 A * | 6/1982 | Inaba et al. .................... 74/826 |
| 4,353,271 A * | 10/1982 | Pieczulewski ............... 74/826 |
| 4,417,486 A * | 11/1983 | Tsukiji et al. .............. 74/813 R |
| 4,520,595 A * | 6/1985 | Diener ........................ 451/28 |
| 4,523,360 A * | 6/1985 | Giovanola ................... 29/38 C |
| 4,655,652 A | 4/1987 | Schissler |
| 4,838,561 A * | 6/1989 | Baranzelli et al. .......... 279/127 |
| 5,083,070 A | 1/1992 | Poupard et al. |
| 5,141,368 A * | 8/1992 | Bullard et al. .............. 408/1 R |
| 5,440,952 A * | 8/1995 | Nakashima et al. ...... 74/813 L |
| 5,635,808 A | 6/1997 | Roseliep |
| 5,676,360 A | 10/1997 | Boucher et al. |
| 5,784,932 A * | 7/1998 | Gilberti .................... 74/813 R |
| 6,113,845 A | 9/2000 | Contreras |
| 6,116,616 A * | 9/2000 | Bratten ....................... 277/646 |
| 6,116,617 A * | 9/2000 | Kofler ........................ 279/133 |
| 6,178,608 B1 * | 1/2001 | Koch .......................... 29/33 P |
| 6,245,284 B1 | 6/2001 | Cooper, Sr. |

* cited by examiner

*Primary Examiner*—Derris H. Banks
*Assistant Examiner*—Michael W. Talbot
(74) *Attorney, Agent, or Firm*—Molly D. McKay

(57) ABSTRACT

A computer controlled positioning table for use in automatically rotating a large diameter article into which an evenly spaced circle of bolt holes are to be drilled. The article to be drilled is centered and clamped onto a table top of the table and then the computer rotates the table top incrementally to precisely position the article relative to an associated stationary drill stand that is used to drill the desired holes in the article. Rotation of the table top is computer controlled, allowing the operator to select the number of bolt holes for each article. Once the table top has rotated to the proper position, locking mechanisms and support roller provided under the table top hold the table top stationary in the proper position while a hole is drilled in the article.

2 Claims, 4 Drawing Sheets

COMPUTER CONTROLLED POSITIONING TABLE

BACKGROUND OF THE INVENTION

1. Field of the Invention

The present invention relates to a computer controlled positioning table for use in automatically rotating a large article into which an evenly spaced circle of bolt holes are to be drilled. The article to be drilled is centered on a table top of the table and then the computer rotates the table top incrementally to precisely position the article relative to an associated stationary drill stand to be used in drilling the desired holes in the article. Once the table top has rotated to the proper position, locking mechanism hold the table top in position while a hole is drilled in the article by the associated drill stand. Rotation of the table top is computer controlled, allowing the operator to select the number of bolt holes for each article. The present invention allows the operator to quickly and repeatedly create articles with evenly spaced bolt holes or any other desired spacing of bolt holes accurately located to within very close tolerances.

2. Description of the Related Art

Smaller articles that need to have a plurality of evenly spaced holes drilled can be fairly easily and accurately drilled with currently available equipment. Smaller articles, i.e. those articles having outside diameters (OD) of up to approximately 100 inches, can be placed on an automated drill table in order to drill evenly spaced holes in the article. One such automated drill table which includes preprogrammed bolt spacing was produced by Babin since approximately the 1950's. This automated drill table has the drawback that the number of bolt spacing was preprogrammed and therefore limited to approximately twenty different spacings. It was not useful if a different number or spacing of bolt holes was desired or needed.

However, larger articles, such as ones of an OD exceeding 100 inches and up to approximately 182 inches in OD still must be manually laid out and then drilled. These large articles generally are heavy, i.e. weighing up to 20,000 pounds, and are difficult to handle. Manually laying out the spacing of the holes involves first scribing a circle on which each of the holes is to be centered, and then using a divider to mark the individual spacing for the desired number of holes. This process is time consuming and inaccurate. Also, once the center for each hole has been marked, then either the drill or the article or both must be manually positioned to try to place the drill bit precisely centered on the center mark for each hole. This process, even if conducted by highly skilled and experienced workman, will normally result in an article having hole spacing that are not within close tolerances. Tolerances in excess of 1/32 inch are generally unacceptable.

The present invention addresses this problem by providing a computer controlled positioning table that can be used to automatically rotate a large article into which an evenly spaced circle of bolt holes are to be drilled. The present invention can be used on articles up to approximately 182 inches in OD and can bear a balance load of approximately 20,000 pounds. The article to be drilled is centered on a table top of the table and then the computer rotates the table top incrementally to precisely position the article relative to an associated stationary drill stand to be used in drilling the desired holes in the article.

Once the table top has rotated to the proper position, a variety of locking mechanisms hold the table top in position while a hole is drilled in the article by the associated drill stand. The outside portion of the table top is provided with additional support and locking capability by way of support rollers with locking mechanisms to prevent the table top and the attached article from tipping or otherwise moving while the holes are being drilled. Because rotation of the table top is computer controlled, the number of bolt holes can be selected for each article and the location of the bolt holes can be precisely controlled by moving only the table top relative to a stationary drill stand. The present invention allows the operator to quickly and repeatedly create articles with evenly spaced bolt holes accurately located to within very close tolerance.

SUMMARY OF THE INVENTION

The present invention is a computer controlled positioning table for holding and automatically rotating a large article into which an evenly spaced circle of bolt holes are to be drilled. The table top of the present invention is large enough to accommodate articles up to approximately 182 inches in OD and can bear a balance load of approximately 20,000 pounds. The article to be drilled is first placed on stand offs that rest on rails that attach radially to the top of the table top. Next, the article is centered on the table top by means of centering devices provided attached to additional rails that are also attached radially to the top of the table top. Once the article is centered on the table top, it is clamped in place by clamps that are provided attached to still additional rails that are likewise attached radially to the top of the table top.

Once the article is thus centered and clamped to the rotable table top, the operator then enters the desired hole spacing sequence into the computer via the computer's keypad and then pushes a button on the computer to activate the indexing sequence for the desired number of bolt holes to be drilled in the article. The computer then activates drive motor that rotates the table top incrementally to precisely position the article relative to an associated stationary drill stand so that the drill stand can be employed to drill the first one of the desired holes in the article without further repositioning of either the article or the drill stand. The drive motor is located under the table top at the base. The drive motor is provided with a gear that engages a geared bearing that is secured to the bottom of the table top. Half of the geared bearing attaches to the bottom of the table top and the other half attaches to the base as a means of rotatably supporting the table top on the base.

When the drive motor operates, the table top rotates. The drive motor is provided with resolver feedback that communicates with the computer to let the computer know when the drive motor has moved the table top to the desired location. Alternately instead of using resolver feedback, although not illustrated in the drawings, inductosyn scales may be provided around the perimeter of the table top and can communicate with the computer as a means of providing feedback to the computer to let the computer know when the drive motor has moved the table top to the desired location. The drive motor has its own braking system built into the motor. Additionally, the drive motor's own internal braking system is assisted in precisely positioning the table top by a backlash brake. The backlash brake is located under the table top at the base, and it is provided with a gear that also engages the geared bearing. The purpose of the backlash brake is to take up the slack in the movement of the table top that results from the small amount of play that necessarily occurs between mating gears, in this case the gear of the drive motor and the geared bearing of the table top.

Once the table top has rotated to the proper position, the back lash brake and the drive motor's own internal braking system hold the table top in position. Approximately two seconds after the resolver feedback from the drive motor communicates to the computer that the table top is properly positioned, the computer activates brake calipers that are provided on support roller stands located under the table top near the perimeter of the table top. These brake calipers clamp together around a downwardly extending lip provided on the bottom of the table top to hold the table top in position and prevent it from moving. The various braking mechanisms, i.e. the internal brake system of the drive motor, the backlash brake, and the brake calipers, are all controlled by the computer. Together the various braking mechanisms hold the table top and its attached article stationary while a hole is drilled in the article by the associated drill stand. The outside portion of the table top is provided with additional support by way of support rollers that are provided on the support roller stands to prevent the table top, which overhangs its supporting base, and the article attached on top of the table top from tipping or otherwise moving while the holes are being drilled. It is important that the table top remain stationary during the drilling process so that each hole is drilled at precisely the right location and is drilled straight.

The top surface of the table top is sloped slightly toward a center opening that is provided in the table top so that cooling fluid from the drill bit that flows onto the table top drains off of the table top into a cooling fluid reservoir provided in the base of the table. The cooling fluid that is collected in the cooling fluid reservoir can be recirculated to the drill bit as a means of cooling the drill bit. Although the invention has been described as having its table top sloped toward a center opening, the invention is not so limited and the slope can be toward the perimeter of the table top instead with a collection tray provided at the perimeter for collecting and funneling the cooling fluid to a cooling fluid reservoir.

Once a bolt hole has been drilled and the drill bit retracted from the hole, the operator pushes a button on the computer to start the indexing sequence to turn the table top and its attached article to the position where the next bolt hole is to be drilled. This indexing sequence is controlled by the computer which first releases the various locking mechanisms so that the table top can be rotated for the next bolt hole. Because rotation of the table top is computer controlled, the number of bolt holes can be selected for each article and the location of the bolt holes can be precisely controlled by moving the table top relative to a stationary drill stand. The present invention allows the operator to quickly and repeatedly create articles with evenly spaced bolt holes accurately located to within very close tolerance. A typical tolerance achievable by this table is within 0.018 inch for a 162 inch diameter article or 0.001 inch for a 40 inch diameter article.

DETAILED DESCRIPTION OF THE PREFERRED EMBODIMENT THE INVENTION

Figure 1:
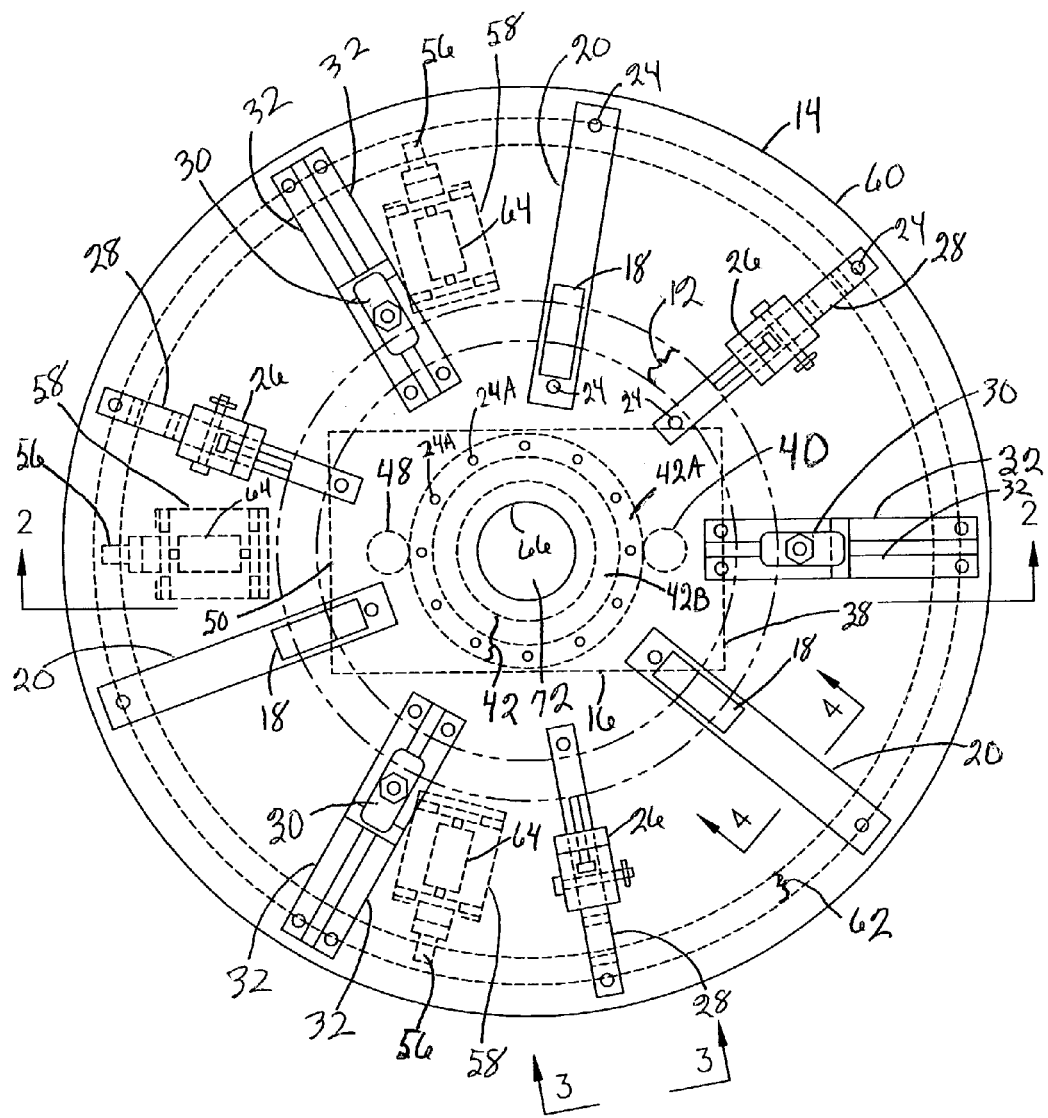
FIG. 1 is a top plan view of a table constructed in accordance with a preferred embodiment of the present invention, showing in outline the article to be drilled and features that are located under a table top of the table without showing a computer and connections to the computer.
Figure 2:
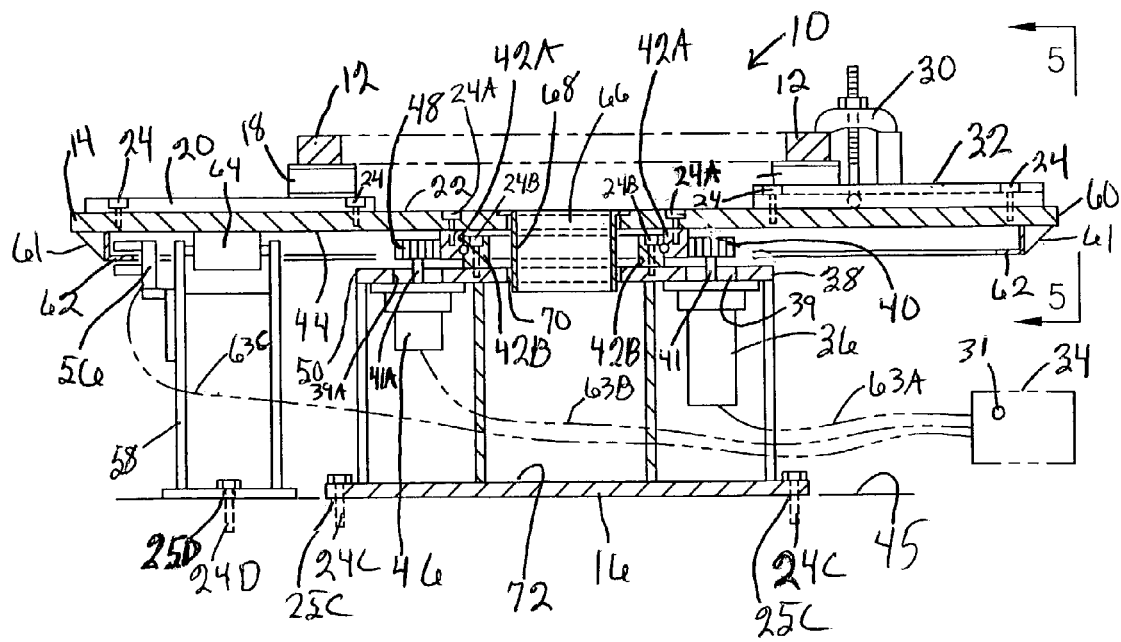
FIG. 2 is a cross sectional view taken along line 2—2 of FIG. 1 and showing the connections to the computer.
Figure 6:
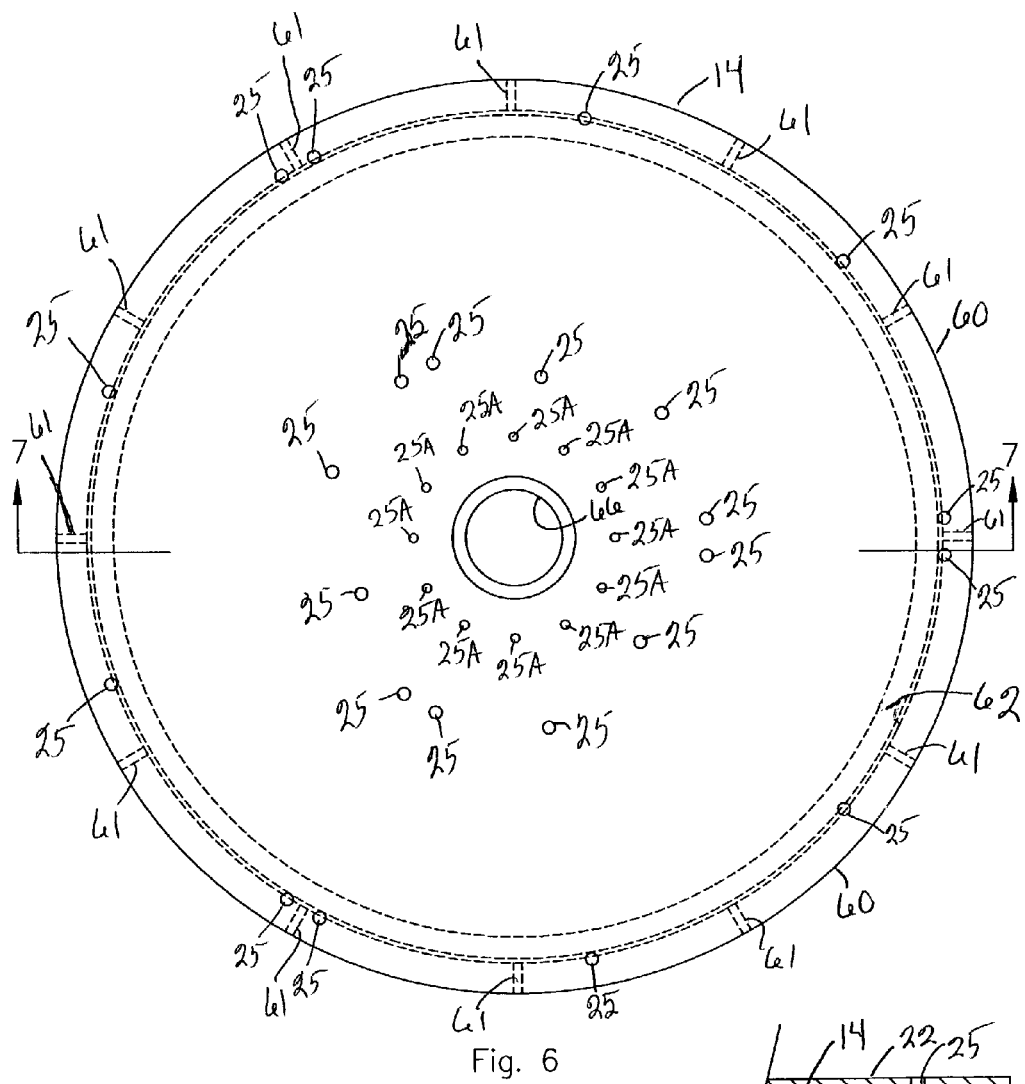
FIG. 6 is a top view of the table top of FIG. 1 shown removed from the base and with the rails removed from the top of the table top.

Referring now to the drawings and initially to FIG. 2, there is illustrated a computer controlled positioning table 10 constructed in accordance with a preferred embodiment of the present invention. Referring also to FIG. 1, the table 10 is provided with a rotatable table top 14 that is rotatably supported on a central base 16. The table top 14 that is designed to hold and automatically rotate a large article 12 into which an evenly spaced circle of bolt holes are to be drilled. The table top 14 of the present invention is large enough to accommodate articles 12 up to approximately 182 inches in OD and can bear a balance load of approximately 20,000 pounds.

Figure 3:
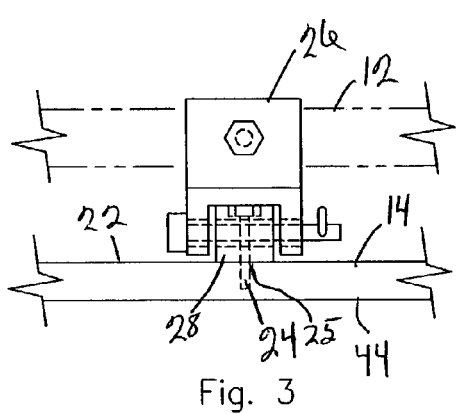
FIG. 3 is a cross sectional view taken along line 3—3 of FIG. 1.
Figure 5:
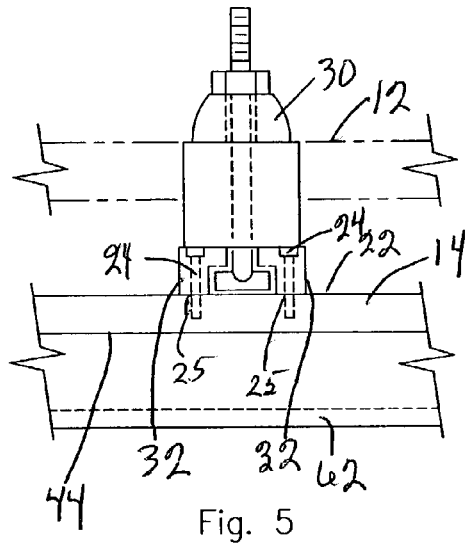
FIG. 5 is a cross sectional view taken along line 5—5 of FIG. 2.
Figure 4:
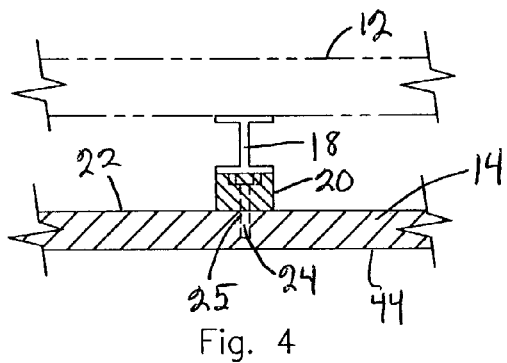
FIG. 4 is a cross sectional view taken along line 4—4 of FIG. 1.

The article 12 to be drilled is first placed on stand offs 18 that rest on stand off rails 20, as illustrated in FIGS. 1, 2, and 4. The stand off rails 20 attach radially to a top 22 of the table top 14 via bolts 24. Next, the article 12 is centered on the table top 14 by means of centering devices 26 provided attached to centering rails 28, as illustrated in FIGS. 1 and 3. The centering rails 28 are also attached radially to the top 22 of the table top 14 via bolts 24. Once the article 12 is centered on the table top 14, it is clamped in place on the table top 14 by clamps 30 that are provided attached to clamp rails 32, as illustrated in FIGS. 1, 2, and 5. The clamp rails 32 are likewise attached radially to the top 22 of the table top 14 via bolts 24. The drawings show three each of rails 20, 28 and 32, but the invention is not so limited, and additional rails 20, 28, and 32 may be employed.

Once the article 12 is thus centered and clamped to the rotable table top 14, the operator then pushes a start button 31 on a computer 34 to activate the indexing sequence for the desired number of bolt holes that the operator previously selected on the computer 34 to be drilled in the article 12. The computer 34 calculates the spacing between bolt holes for any number of selected bolt holes previously selected by the operator and then controls the operation of the table 10 to incrementally move the table top 14 to the exact positions where the bolt holes need to be drilled. The computer 34, the drive motor 36 and the geared bearing 42 can be obtained from manufacturers of weld positioning equipment. One such manufacturer is Preston-Eastin, Inc. located in Tulsa, Oklahoma.

The computer 34 activates a drive motor 36 that is secured to base 16 via bolts (not illustrated) that secure in bolt holes 37 provided in the base 16. The drive motor 36 is secured to one end 38 of the base and is located on a bottom 44 of the table top 14. The base 16 is provided with a drive opening 39 through which a drive shaft 41 of the drive motor 36 extends. The drive motor 36 rotates the table top 14 incrementally to precisely position the table top 14 and its attached article 12 relative to an associated stationary drill stand (not illustrated) positioned over the table top 14 so that the drill stand can be employed to drill the first one of the desired holes in the article 12. Before the first bolt hole is drilled, the drill bit is first positioned the proper distance from the edge of the article to be drilled. Thereafter the drill can be used to drill all of the other bolt holes in the article without further repositioning the article 12 relative to the table top 14 or repositioning either the drill or drill stand relative to the table top 14 and its attached article 12.

In order to rotate the table top 14, the drive motor 36 is provided with a drive gear 40 on its drive shaft 41 that engages a geared bearing 42 that is secured to the bottom 44 of the table top 14. One half 42A of the geared bearing 42 attaches to the bottom 44 of the table top 14 via bolts 24A, and the other mating half 42B of the geared bearing 42 attaches to the base 16 via bolts 24B. The geared bearing 42 serves as a means of rotatably supporting the table top 14 on the base 16. The base 16 is preferably secured to a cement supporting slab 45 via additional bolts 24C, or alternately the base 16 can be secured to the drill stand with which it is to be employed.

When the drive motor 36 operates, the drive gear 40 turns the half 42A of the geared bearing 42 and thereby rotates the table top 14 to which the half 42A is attached. The drive motor 36 is provided with resolver feedback that communicates with the computer 34 to let the computer 34 know when the drive motor 36 has moved the table top 14 and attached article 12 to the desired location. The drive motor 36 has its own braking system built into the drive motor 36. Additionally, the drive motor's own internal braking system is assisted in precisely positioning the table top 14 by a backlash brake 46 that is secured to base 16 via bolts (not illustrated) that secure in bolt holes 37A provided in the base 16.

The backlash brake 46 is secured to an opposite end 50 of the base and is located on the bottom 44 of the table top 14. The base 16 is provided with a brake opening 39A through which a brake shaft 41A of the backlash brake 46 extends.

Figure 9:
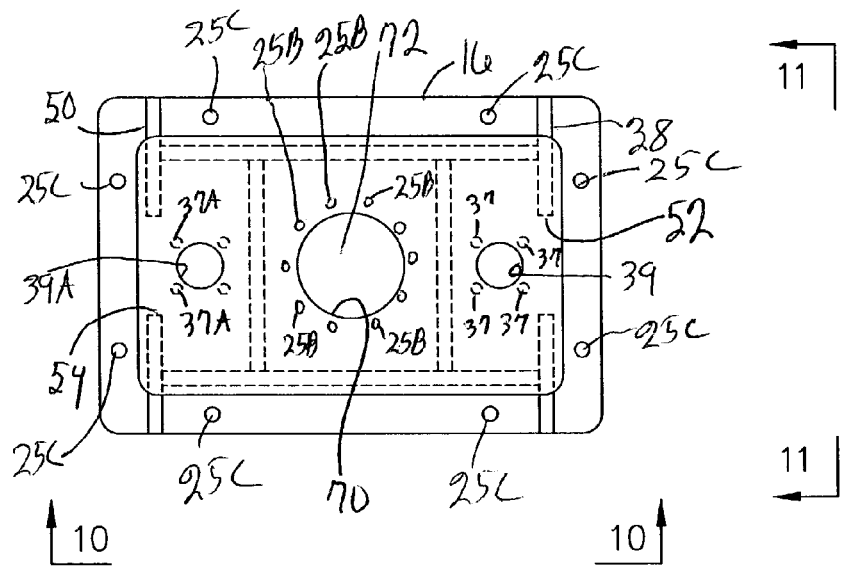
FIG. 9 is a top plan view of the base shown with the table top, drive motor and back lash brake removed.
Figure 11:
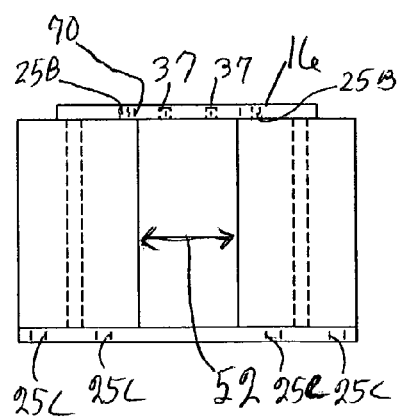
FIG. 11 is an end view taken along line 11—11 of FIG. 10.

As shown in FIGS. 9 and 11, end 38 of the base 16 is provided with an opening 52 for accessing the drive motor 36, and end 50 of the base 16 is provided with a similar opening 54 for accessing the backlash brake 46. The backlash brake 46 is provided with a brake gear 48 that also engages the half 42A of the geared bearing 42. The purpose of the backlash brake 46 is to take up the slack in the movement of the table top 14 that results from the small amount of play that necessarily occurs between mating gears, in this case the drive gear 40 of the drive motor 36 and the half 42A of the geared bearing 42 attached to the bottom 44 of the table top 14, and thereby stops the table top 14 at its desired position.

Once the table top 14 has rotated to the proper position, the back lash brake 46 and the drive motor's own internal braking system hold the table top 14 in position. Approximately two seconds after the resolver feedback from the drive motor 36 communicates to the computer 34 that the table top 14 is properly positioned, the computer 34 automatically activates brake calipers 56 that are provided on support roller stands 58 located under the table top 14 at various intervals near the perimeter 60 of the table top 14. The support roller stands 58 are preferable secured to the cement supporting slab 45 via still additional bolts 24D, or alternately secured directly to the drill stand with which the table 10 is to be employed. Although the drawings illustrated three support roller stands 58, the invention is not so limited and additional support roller stands 58 may be employed.

Figure 8:
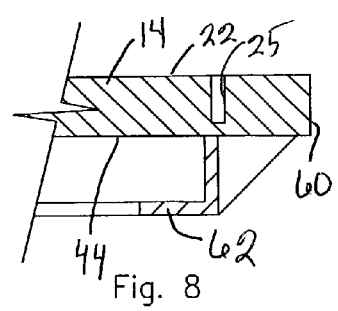
FIG. 8 is an enlarged view of the area within circle 8 of FIG. 7.
Figure 7:
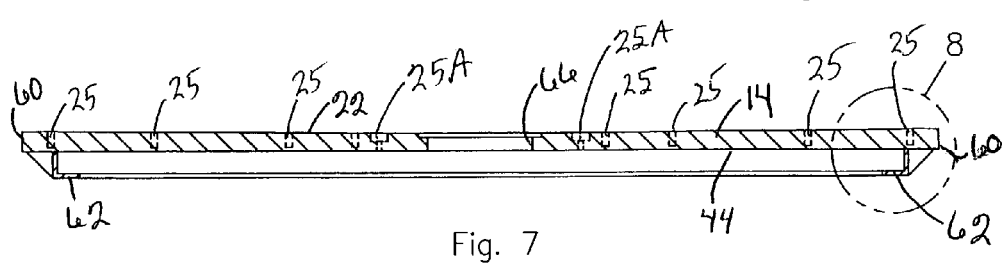
FIG. 7 is a cross sectional view taken along line 7—7 of FIG. 6.

As best illustrated in FIGS. 2 and 8, these brake calipers 56 clamp together around an L-shaped lip 62 provided extending downward on the bottom 44 of the table top 14 to hold the table top 14 in position and to prevent it from moving. The L-shaped lip 62 is continuous on the bottom 44 of the table top 14, as illustrated in FIG. 7, and is supported on the bottom 44 of the table top 14 by a plurality of braces 61. The L-shaped lip 62 serves as a rotor for the brake calipers 56. The L-shaped lip 62 in conjunction with the brake calipers 56 serve as a perimeter disc brake for the table 10. The various braking mechanisms, i.e. the internal brake system (not illustrated) of the drive motor 36, the backlash brake 46, and the plurality of brake calipers 56, are all controlled by the computer 34. FIG. 2 shows the line 63A connecting the drive motor 36 to the computer 34, the line 63B connecting the backlash brake 46 to the computer 34, and the one of several lines 63C that connect each of the brake calipers 56 to the computer 34.

Together the various braking mechanisms hold the table top 14 and its attached article 12 stationary while a hole is drilled in the article 12 from above by the associated drill stand. The perimeter 60 of the table top 14 is provided with additional support by way of support rollers 64 that are provided on the support roller stands 58 to prevent the table top 14, which overhangs its supporting base 16, and the article 12 attached on the top 22 of the table top 14 from tipping or otherwise moving while the holes are being drilled. It is important that the table top 14 remain stationary during the drilling process so that each hole is drilled at precisely the right location in the article 12 and is drilled straight and true.

Figure 10:
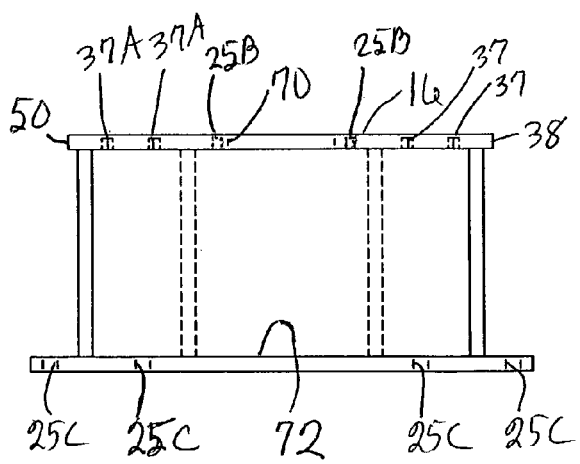
FIG. 10 is a side view taken along line 10—10 of FIG. 9.

The top 22 of the table top 14 is sloped slightly toward a center opening 66 that is provided in the table top 14 so that cooling fluid from the drill bit that flows onto the table top 14 drains to the center opening 66 of the table and then through a downwardly extending center tube 68 that is attached to the center opening 66 to a fluid reservoir 72 provided in the base 16 of the table, as illustrated in FIG. 2. To prevent the cooling fluid from reaching the bottom 44 of the table top 14 and the equipment located under the table top 14, the center tube 68 extends downward through an opening 70 in the base 16 that provides access to the cooling fluid reservoir 72, as shown in FIGS. 9 and 10. The cooling fluid that is collected in the cooling fluid reservoir 72 can be recirculated to the drill bit as a means of cooling the drill bit.

Once a bolt hole has been drilled in the article 12 and the drill bit has been retracted from the drilled hole, the operator pushes the button 31 on the computer 34 to activate the indexing sequence in order to turn the table top 14 and its attached article 12 to the position where the next bolt hole is to be drilled. This indexing sequence is controlled by the computer 34 which first releases the various locking mechanisms so that the table top 14 can be rotated for the next bolt hole, then rotates the table top 14 to the location for the next bolt hold, and again locks the various locking mechanisms so that the next bolt hole can be drilled.

Because rotation of the table top 14 is controlled by the computer 34, the number of bolt holes can be selected by the operator for each article 12 and the location of the bolt holes are then precisely controlled by rotation of the table top 14 relative to a stationary drill stand. The present invention allows the operator to quickly and repeatedly create articles 12 with evenly spaced bolt holes accurately located to within very close tolerance. A typical tolerance achievable by this table 10 is within 0.018 inch for a 162 inch diameter article 12 or 0.001 inch for a 40 inch diameter article 12.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A computer controlled positioning table for use in automatically rotating and accurately positioning a large diameter article into which an evenly spaced circle of bolt holes or bolt holes of any other desired spacing are to be drilled comprising:

- a table top rotatable supported in a horizontal orientation by a base, centering means for centering an article to be drilled on the table top, clamping means for securing the article to be drilled onto the table top once the article has been centered on the table top,
- means for rotating said table top relative to said base, said means for rotating said table top connected to and operationally controlled by a computer,
- means for braking the rotation of said table top so that the table top is positioned precisely by said computer, said means for braking the rotation of said table top connected to and operationally controlled by the computer,
- said computer programmed to rotate the table top incrementally to the proper locations in which bolt holes are to be drilled into the article that is centered on and secured to the table top,
- said means for rotatably supporting said table top in a horizontal orientation on said base further comprising a geared bearing having a first half secured to said table top and a second half secured to said base, and said halves of the geared bearing rotatable relative to each other,
- said means for rotating said table top relative to said base further comprising a drive motor secured to the base, a drive gear provided on a drive shaft of said drive motor, and said drive gear engaging said first half of said geared bearing so that said first half and the attached table top both rotate in conjunction with said drive gear,
- said means for braking the rotation of said table top further comprising a backlash brake secured to the base, a brake gear provided on a brake shaft of said backlash brake, and said brake gear engaging said first half of said geared bearing so that the brake gear stops rotation of said first half and the attached table top, and
- a perimeter of said table top extending beyond said base, support rollers provided on support roller stands located under said table top, said support rollers engaging the bottom of said table top adjacent the perimeter to further support the table top.

2. A computer controlled positioning table according to claim 1 further comprising:

brake calipers provided on each support roller stand, each said brake caliper connected to and operationally controlled by the computer, each said brake caliper removably engaging a downwardly extending lip provided on the bottom of the table top at the perimeter as a means of securing the table top in a stationary position.

\* \* \* \* \*